United States Patent [19]
Shibazaki

[11] Patent Number: 5,748,236
[45] Date of Patent: *May 5, 1998

[54] COLOR MIXING PREVENTION AND COLOR BALANCE SETTING DEVICE AND METHOD FOR A FIELD-SEQUENTIAL COLOR TELEVISION CAMERA

[75] Inventor: Kiyoshige Shibazaki, Higashimurayama, Japan

[73] Assignee: Nikon Corporation, Tokyo, Japan

[*] Notice: The term of this patent shall not extend beyond the expiration date of Pat. No. 5,548,333.

[21] Appl. No.: 663,364

[22] Filed: Jun. 13, 1996

Related U.S. Application Data

[63] Continuation-in-part of Ser. No. 352,797, Dec. 1, 1994, Pat. No. 5,548,333.

[30] Foreign Application Priority Data

Dec. 10, 1993 [JP] Japan ................... 5-341491
Dec. 14, 1993 [JP] Japan ................... 5-342402
Dec. 15, 1993 [JP] Japan ................... 5-342907

[51] Int. Cl.$^6$ ........................................ H04N 9/04
[52] U.S. Cl. ................ 348/270; 348/273; 348/268; 348/223; 348/225

[58] Field of Search .................... 348/268, 269, 348/270, 273, 277, 237, 223, 225, 228, 294, 295, 297, 298; H04N 9/04

[56] References Cited

U.S. PATENT DOCUMENTS

| | | | |
|---|---|---|---|
| 4,851,899 | 7/1989 | Yoshida et al. | 358/42 |
| 4,875,091 | 10/1989 | Yamada et al. | 358/42 |
| 4,878,112 | 10/1989 | Ieoka | 358/92 |
| 5,233,416 | 8/1993 | Inoue | 358/98 |

*Primary Examiner*—Glenton D. Burgess
*Attorney, Agent, or Firm*—Oliff & Berridge

[57] ABSTRACT

A device and method provides high-speed processing in a color television camera without color mixing and achieves a color balance. The device comprises a color filter for color separating the light from the object being photographed, a solid state imaging element that forms an image from the light separated by the color filter, and with which control of charge accumulation is possible; and an accumulation time regulating device that sets the charge accumulation time of the solid state imaging element so as to avoid the color mixing interval during which color boundaries of the color filter are passing over the solid state imaging element. Color balance of a field-sequential color television camera can be set without relying on a signal executing circuit.

12 Claims, 12 Drawing Sheets

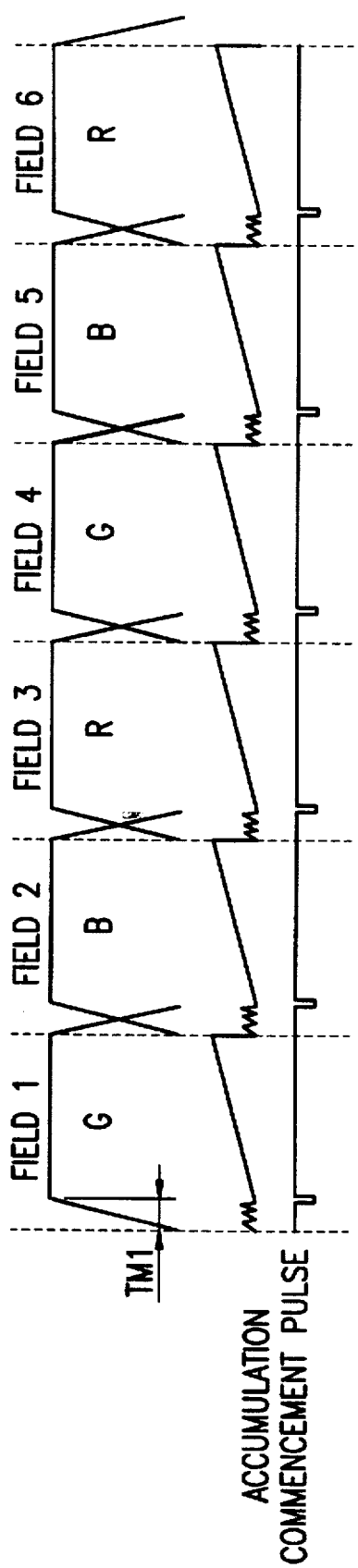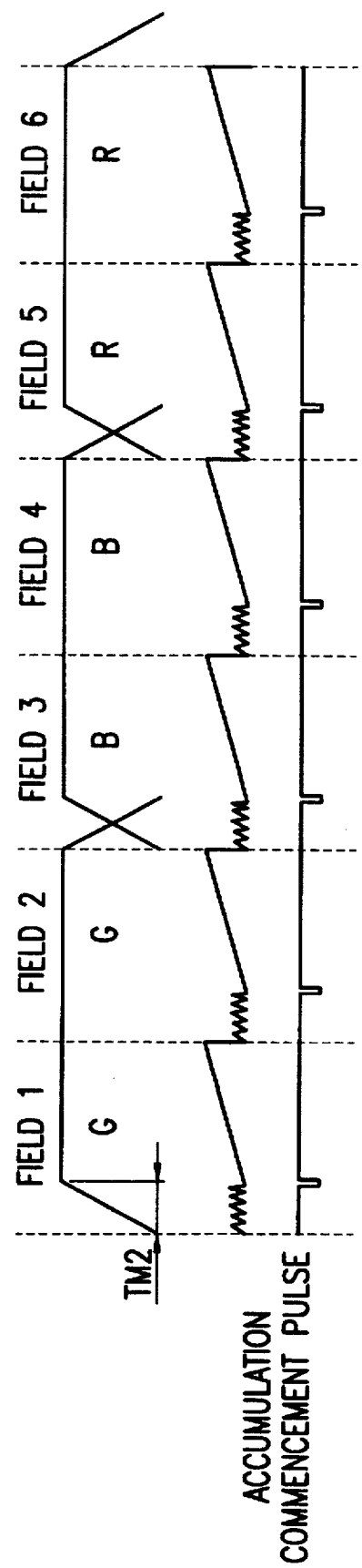

COLOR MIXING PREVENTION AND COLOR BALANCE SETTING DEVICE AND METHOD FOR A FIELD-SEQUENTIAL COLOR TELEVISION CAMERA

This is a Continuation-in-Part of application Ser. No. 08/352,797, filed Dec. 1, 1994, now U.S. Pat. No. 5,548,333.

BACKGROUND OF THE INVENTION

1. Field of the Invention

The present invention relates to a color mixing prevention method and device for a field-sequential color television camera that uses a rotating filter wheel with side-by-side color filters to sequentially filter imaging light. The present invention also relates to a color balance setting method and device for a field-sequential color television camera that maximizes use of the fields and adjusts the time intervals for charge accumulation to achieve color balance in lieu of complexities in the signal executing circuit system.

2. Description of Related Art

In general, with color television cameras that use a solid state imaging element or the like, it is necessary to adjust the white balance in order to correct discrepancies in the color balance that occur through differences in color temperature or the like from the light source. This type of white balance adjustment has conventionally imaged a white object, for example, or taken light from a white light source into the camera, and adjusted the gain of each color through a white balance circuit located in the movie signal executing circuit of the camera. It has thus been possible, through adjusting the white balance, to image a white object, for example, with the proper degree of whiteness.

FIG. 6 shows the action timing of a prior art field-sequential color television camera that uses a solid state imaging element and a color separating color filter. With the field-sequential color television camera that corresponds to FIG. 6, one revolution of a rotary color filter with the three filter domains of G (green), B (blue), and R (red) is synchronized with the time interval for one cycle of 9 field divisions of the solid state imaging element. In the time interval from field 1 to field 3 the green field domain passes the imaging surface of the solid state imaging element. The blue domain passes during the interval from fields 4–6, and the red domain passes during the interval from fields 7–9. The solid state imaging element does not accumulate light from the object being photographed during all of the field intervals, but transmits the charge accumulated at the end of the fields to the surface image executing circuit of the camera. In the surface image signal executing circuit, a signal corresponding to the transmitted charge for each color is recorded, the signals recorded for each color being composed according to the desired ratios, and color image signals being formed and output.

With the above-mentioned prior-art field-sequential color television camera, two different color signals are projected onto the imaging surface and accumulated during the interval TM3, during which the color boundaries of the color separating filter pass over the imaging surface of the imaging element, resulting in color mixing. Any charge accumulating during the color mixing interval is not useful because it results from two different colors. With prior-art field-sequential color television cameras, the surface image accumulation is not carried out during the entire field time interval of the solid state imaging element when the field time interval includes color mixing. The surface image signals of fields that include the color mixing time interval TM3 are discarded, and ultimately cannot be used in the formation of the color image signal. For example, referring to FIG. 6, the data from fields 1, 4 and 7 would be discarded. U.S. Pat. No. 4,851,899, the disclosure of which is incorporated herein by reference, discloses such a prior art system.

Therefore, high-speed image input cannot be performed because the imaging signals from fields that include color mixing, during which the color boundaries of the color separating filter pass over the imaging surface, are ignored, and only the imaging signals from the other fields are used.

Additionally, such color television cameras require white balance circuits to adjust the gain of each color in the image signal executing circuit for the white balance. Such circuits complicate the construction of the camera circuits and hinder the development of smaller, lighter color television cameras. Because the signal level of image signals prior to the white balance execution in a prior-art color television camera varies widely with each color and because the signal executing circuits cross a wide dynamic range and must move stably and precisely, the circuits becomes very complicated and costly.

SUMMARY OF THE INVENTION

An object of the present invention is, with a field-sequential or other type of color television camera, to make possible the effective use of imaging element signals from fields that include color mixing intervals, and to make possible a higher-speed surface image input.

Another object of the present invention is, with a field-sequential or other type of color television camera, to make possible a precise color balance adjustment using a simple circuit construction, without reliance on only the white balance circuit in the signal executing system.

Another object of the present invention is, with a field-sequential or other type of color television camera, to make possible the adjustment of color balance without imparting a large load to the signal executing circuit system, and to make possible high-speed image input.

Another object of the present invention is, with a field-sequential or other type of color television camera, to automatically perform a color balance adjustment using a simple circuit construction, without relying on the white balance circuit in the signal executing system.

Another object of the present invention is, on a field-sequential or other type of color television camera, to make possible an automatic color balance adjustment without imparting a large load to the signal executing circuit system, and to make possible a high-speed image input.

In order to accomplish the above and other objects, embodiments of the present invention provide a color mixing prevention device for a field-sequential color television camera in which charge does not begin to accumulate in a solid state imaging element until after the color mixing interval of a given field is completed. Any charge generated in the solid state imaging element during color mixing is discarded.

The operation of the present invention prevents charge accumulation for transmission during the color mixing time interval, during which the color boundaries of the color filter pass over the solid state imaging element at least within one field interval. A charge is accumulated for transmission only during intervals other than the color mixing time intervals. Since intervals other than the color mixing time intervals of each field are used, an efficient high-speed imaging system becomes possible.

CCDs, for example, may be used in the solid state imaging element. Charge accumulation for transmission during color mixing can be avoided by regulating each timing pulse from the drive circuit of the solid state imaging device. Thus, color image signals with no color mixing can be rapidly obtained.

In order to further accomplish objectives stated above, the present invention provides a charge accumulation regulation device that adjusts the color balance by setting the time of charge accumulation of the solid state imaging element for each field for each color.

No charge is accumulated for transmission at least during the color mixing time intervals, during which the color boundaries of the color filter pass over the solid state imaging element.

In first and second embodiments of the invention, the start of charge accumulation is set to coincide with the end of the color mixing interval for the first field of each color of the color filter wheel. In third, fourth and fifth embodiments of the invention, color balance is achieved by adjusting within the field time intervals other than the color mixing time interval the accumulation time intervals for each color.

The present invention provides a method of setting the color balance on a field-sequential color television camera, comprising color separating the light from the object being photographed using a color filter, imaging the light from the object being photographed that has been separated by the color filter using a solid state imaging device that has regulated charge accumulation, and adjusting the color balance by setting the charge accumulation time of the solid state imaging element in the fields for each color.

In the third and fourth embodiments of the present invention, a timing regulation signal from the signal executing circuit adjusts the charge accumulation time interval of the solid state imaging device to correct the imbalance of the gain for each color caused by differences in light source color temperatures or the like, and adjust the color balance. Therefore it is not necessary to use a complex white balance circuit, making it possible to make the color television camera smaller and lighter.

In particular, with a field-sequential color camera that color separates the light from the object being photographed by means of a color filter, the charge accumulated on the surface element is swept up (that is, discarded) during the color mixing time interval, during which the color boundaries of the color filter pass over the surface of the solid state imaging element, and the color balance can be adjusted within time intervals other than the color mixing time interval by varying the accumulation time for each color. There is no need to discard the entire signal from fields that include the color mixing time, making possible high-speed surface image input. It is also possible to perform a suitable color balance adjustment without using a white balance circuit.

In addition, with the third and fourth embodiments of the present invention, since the signal level of the signal circuits prior to the white balance execution do not fluctuate widely from each color, and since the level fluctuations for each color have been already removed by the step that has been output from the solid state imaging device, the load to the signal executing circuit system is lightened, and the construction of the circuit system can be simplified and the cost lowered.

In a fifth embodiment of the present invention, similar to the third and fourth embodiments of the invention, a color balance setting device is described in more detail. In the fifth embodiment of the invention, a charge accumulating initial setting device sets the surface image charge accumulation time of the solid state imaging element corresponding to each color to the same or to a predetermined interval, according to color balance setting instructions. A calculation device separate from the signal executing circuit, obtains a correcting signal, based on the signal value for each color obtained from the solid state imaging element after setting by the initial charge accumulation interval times. A color balance setting device adjusts the surface image charge accumulation time interval for each color of the solid state imaging device based on the correcting signal.

In sixth and seventh embodiments, the invention includes a load discharging signal generating device that sends load discharging signals that control timing for discharging a load accumulated in a period when light having more than two colors enters the imaging elements. Sixth and seventh embodiments further include a projection device that includes at least a light source.

In addition, with the present invention, since the signal level of the signal circuits prior to the white balance execution does not fluctuate widely for each color, and since the level fluctuations for each color have been already removed by the step that has been output from the solid state imaging device, the load on the signal executing circuit system is lightened, and the construction of the circuit system can be simplified and the cost lowered.

BRIEF DESCRIPTION OF THE DRAWINGS

The invention will be described in conjunction with the following drawings in which like reference numerals designate like elements and wherein:

FIG. 3 (b) is a signal waveform diagram showing the regulating pulse supplied to the solid state imaging element;

FIG. 4 (a) is a signal waveform diagram of a first embodiment of the invention using a three-field color filter in the color television camera of FIG. 1;

FIG. 4 (b) is a signal waveform diagram of a second embodiment of the invention using a six-field color filter in the color television camera of FIG. 1;

FIG. 5(a2) is a descriptive waveform diagram showing image signal outputs of the color television camera of FIG. 1 using a three-field color filter;

FIG. 5(b1) is a descriptive waveform diagram showing image signal outputs with a six-field color filter using charge accumulation during the color mixing time intervals;

FIG. 5(b2) is a descriptive waveform diagram showing image signal outputs of the color television camera of FIG. 1 using a six-field color filter;

DETAILED DESCRIPTION OF PREFERRED EMBODIMENTS

Figure 1:
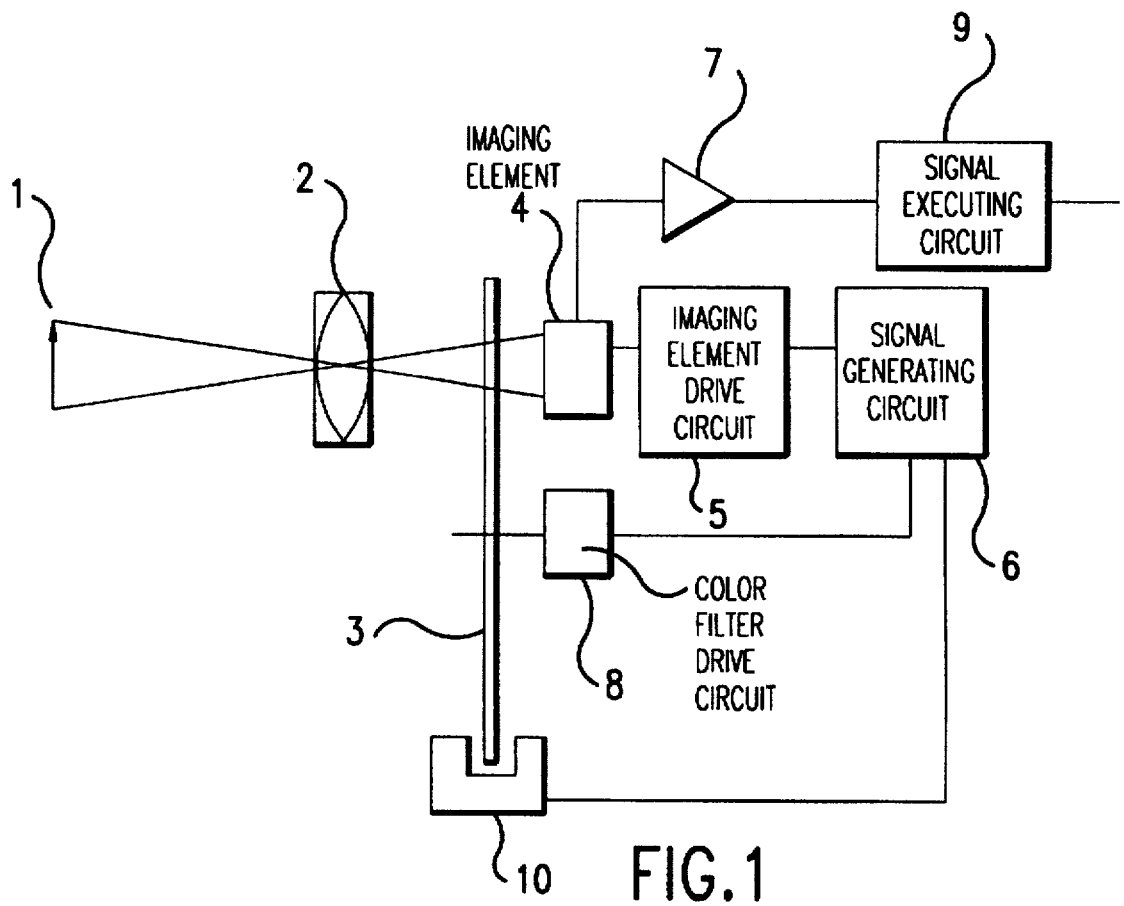
FIG. 1 is a block diagram showing the construction of a field-sequential color television camera that includes a color mixing prevention device according to first and second embodiments of the present invention.

Embodiments of the present invention are described hereafter, with reference to the drawings. FIG. 1 shows the construction of a field-sequential color television camera that relates to an embodiment of the present invention. The device in FIG. 1 comprises an image composing lens 2 that composes an image from the light from the object 1 being photographed onto the imaging surface of a solid state imaging element 4. A color filter 3 for separating the colors is positioned between the image composing lens 2 and the imaging element 4 and is rotated. The imaging element 4 of the device of FIG. 1 is comprised, e.g., of charge coupled devices (CCDs).

The device of FIG. 1 is also equipped with a drive circuit 5 and a synchronized signal generating circuit 6, which supplies a drive pulse to the imaging element 4, an amplifier 7 that amplifies the imaging signal output from the imaging element 4, and a signal executing circuit 9 that receives the imaging signal output from the amplifier 7 and outputs the desired color movie signal. In addition, a motor or other type of color filter driving device 8 is provided to rotate the rotary color filter 3 and a rotation detector 10, such as, for example, a photo interrupter, is provided to detect the rotation of the rotary color filter. The output of the rotation detector 10 is input to the synchronized signal generating circuit 6.

Figure 2:
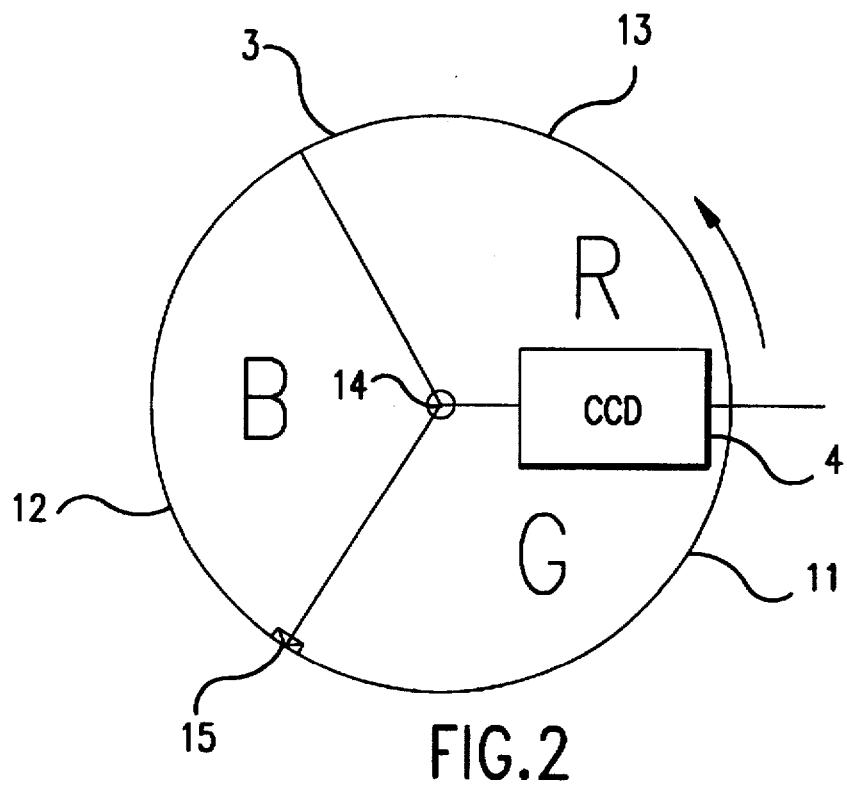
FIG. 2 shows the construction of a color separating filter for use on the color television cameras of FIG. 1, FIG. 7 and FIG. 9.

FIG. 2 shows the construction of the color separating rotary color filter 3 that can be used with the present invention. The color filter 3 in FIG. 2 is divided into three filter domains 11, 12, and 13, each with an angular span of 120°, which pass colors green, blue and red, respectively, as indicated by the letters G, B and R. Filter domain 11 allows only green light to pass, filter domain 12 allows only blue light to pass, and filter domain 13 allows only red light to pass. The color filter 3 is synchronized with the scanning timing of the solid state imaging element 4 and rotated about the axis of rotation 14 by the color filter driving device 8. In FIG. 2, the relative positions of the rotary color filter 3 and the described solid state imaging element are shown. Thus, when the rotary color filter 3 turns in the direction shown by the arrow, the time interval during which the boundaries between the filter domains 11, 12, and 13 pass the imaging surface of the solid state imaging device becomes the color mixing time interval.

An opaque region 15 is provided near the edge of the color filter 3 on the border of filter domains 11 and 12. This opaque region 15 is used to obtain a signal through the rotation detector 10 of FIG. 1 indicating the rotational position of the color filter 3.

Figure 3A:
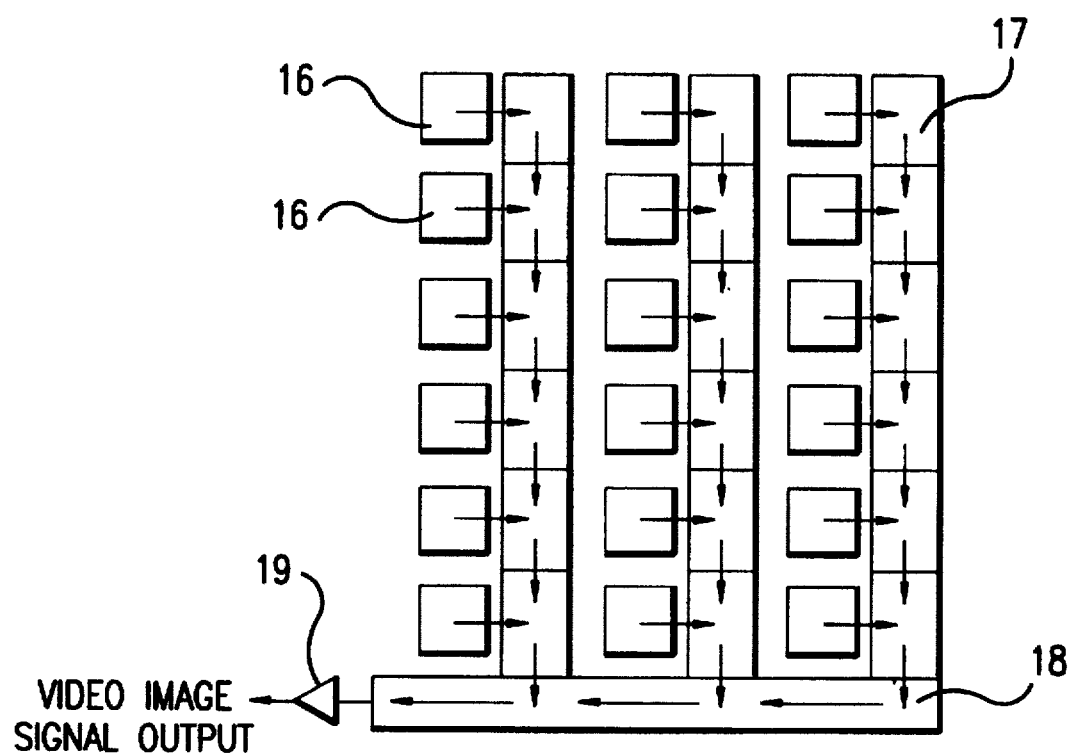
FIG. 3 (a) is a partial plan view showing a sample construction of the solid state imaging element used with the color television cameras of FIG. 1, FIG. 7 and FIG. 9.

The imaging element 4 includes charge accumulating type surface elements in which the accumulating time can be regulated, and in which a reset action is possible. FIG. 3 (a) shows a construction of the solid state imaging element 4 that can be used with the field-sequential color television camera of FIG. 1, and that provides for adjustment of the charge accumulation times. The solid state imaging element 4 in FIG. 3(a) comprises multiple light receiving elements 16, such as photodiodes, arranged in a two-dimensional matrix, vertically transmitting CCDs 17 that receive the charge signals that correspond to the light from the object being photographed from the photo diodes 16 via field shift gates (not shown) and transmit the charge signals in the vertical direction (top to bottom in the drawing), and CCDs 18 that sequentially horizontally transmit the movie image signals from the surface elements that have been sequentially transmitted from each vertically transmitting CCD 17. An amplifier 19 receives the output of the horizontally transmitting CCDs 18.

With this type of solid state imaging element, the light from the object being photographed shines on each surface element (each photo diode 16), and charges that correspond to the intensity of the light from the object being photographed in each position of the surface element are transmitted through a field shift gate (not shown) to the vertically transmitting CCDs 17 that are adjacent to each photo diode 16 between adjacent fields. The vertically transmitting CCDs 17 sequentially transmit each surface image charge that has been input from the photo diodes 16 to the horizontally transmitting CCDs 18, which sequentially transmit the charges supplied from the vertically transmitting CCDs 17 in the horizontal direction, and output them as movie image signal outputs via the amplifier 19.

Figure 3B:
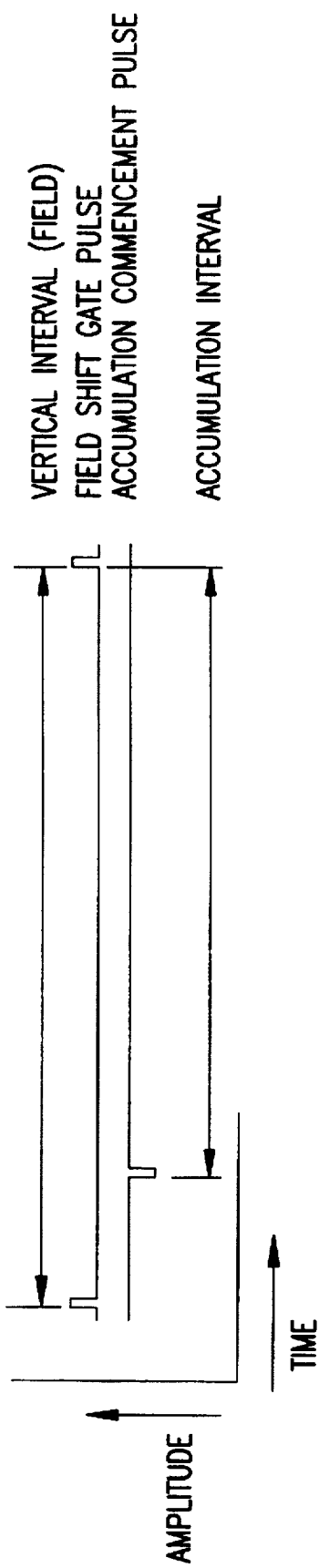

This type of solid state imaging element is driven so that surface element information from one field portion for each cycle of a field shift gate pulse is obtained, as shown in FIG. 3(b). The accumulation of surface element charge in each photo diode 16 begins, for example, at the point of descent of the accumulation commencement pulse, and continues until the point of ascent of the field shift gate pulse. In other words, the interval from the descent of the accumulation commencement pulse to the ascent of the field shift gate pulse becomes the accumulation interval for the light from the object being photographed. Thus, in the interval prior to the accumulation interval in one field, the surface element charge is swept away without being accumulated. The surface element charge accumulated on each surface element during the accumulation interval is output after the completion of the accumulation interval, or at the end of each field.

The field-sequential color television camera of the present invention is controlled so that charges are not accumulated for transmission during the color mixing intervals. In FIG. 1, the light from the object being photographed 1 is composed into an image on the imaging surface of the solid state imaging element 4 by the image composing lens 2. The imaging element drive circuit 5 inputs a drive pulse to the solid state imaging element 4 by means of the fixed field cycle, based on the regulating signal from the synchronized signal generating circuit 6, and prevents charge accumulation for transmission by sweeping up the charge accumulated during the color mixing intervals, and causes the accumulation and transmitting actions described above to be carried out. A regulating signal from the synchronized signal generating circuit 6 is also input to the color filter driving device 8, and the rotation of the color filter 3 and the scanning of the solid state imaging element 4 are synchronized.

The opaque region 15 of the rotary color filter 3 is detected by the rotation detector 10, which inputs information relating to the rotary position of the rotary color filter to the synchronized signal generating circuit 6. The synchronized signal generating circuit 6 determines the color mixing interval, or the interval during which the color boundaries of the rotary color filter 3 pass over the solid state imaging element 4, from the rotary position of the rotary color filter 3, and the position of the imaging surface of the solid state imaging element, based on the signal from the rotation detector 10. The synchronized signal output circuit 6 generates a signal that indicates this color mixing interval to the imaging element drive circuit 5. The imaging element drive circuit 5 generates an accumulation commencement pulse after the color mixing interval has ended, based on the signal from the synchronized signal generating circuit 6, and inputs it to the solid state imaging element 4. The solid state imaging element 4 operates to sweep up charge accumulation until the accumulation commencement pulse is input. When the accumulation commencement pulse is input from the imaging element drive circuit 5, the surface image charge begins to accumulate. This accumulation of surface image charge continues until the end of each field interval, and the charge accumulated at the end of these intervals is transmitted.

The action of the solid state imaging element is next described with reference to FIG. 4(a) and FIG. 4(b). FIG. 4 (a) shows fields using a three-field rotary color filter. As described above, the rotation of the rotary color filter is synchronized with the scanning of the solid state imaging element. One color of the color filter has a pass time at least as long as one field interval. In FIG. 4 (a), the beginning time of each field is designated as the color mixing interval TM1. The charges accumulated in the surface elements of the imaging element during this color mixing interval are removed by sweeping up the charges. The accumulation commencement pulse is then given at the end of the color mixing interval TM1, and accumulation of the surface element charge begins. Thus the accumulation action is performed only in intervals in which the same color of light is shining on all surface elements of the solid state imaging element. This accumulation action is continued until the end of the field interval, transmitted to the exterior at the end of the field intervals, and then output. In this manner, it is possible to use the surface image input from each field, making high-speed imaging possible.

The setting of the color mixing interval, and therefore the setting of the accumulation commencement timing, are determined from the structure of the rotary color filter, the relative positions of the axis of rotation 14 of the filter 3 and the imaging element 4, the image surface size of the imaging element 4, the speed of rotation of the color filter 3, and any other relevant variables.

A six-field rotary color filter may also be used and its field scan operation is described with reference to FIG. 4 (b). In this case, green (G) light from the object is imaged in fields 1 and 2, blue (B) light is imaged in fields 3 and 4, and red (R) light is imaged in fields 5 and 6. Color mixing intervals TM2 are present at the beginning of fields 1, 3, and 5. After these color intervals TM2 are finished, an accumulation commencement pulse is output, and the accumulation of surface image information begins. Fields 2, 4, and 6 do not include color mixing intervals, but, since they each have the same accumulation times as the fields directly preceding them (fields 1, 3, and 5), the timing of the accumulation commencement pulse is the same as when there is a color mixing interval TM2 at the beginning of each field. With this example also, the fields that included color mixing times could be used, making high-speed imaging possible.

Figure 5:
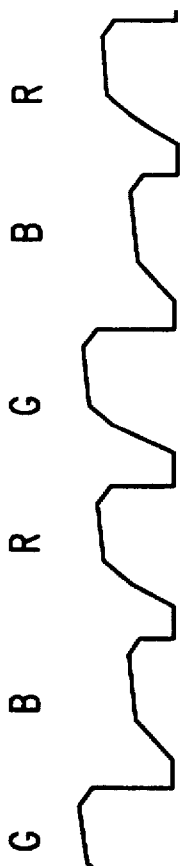
FIG. 5(a1) is a descriptive waveform diagram showing image signal outputs with a three-field color filter using charge accumulation during the color mixing time intervals.
Figure 5:
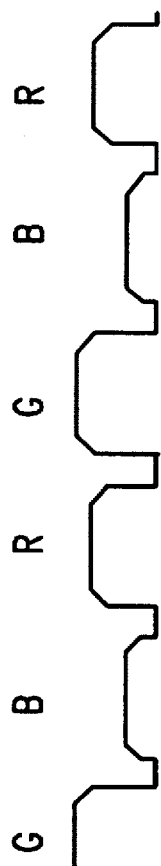
Figure 5:
Figure 5:
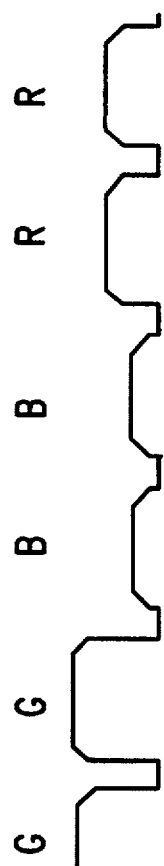
Figure 6:
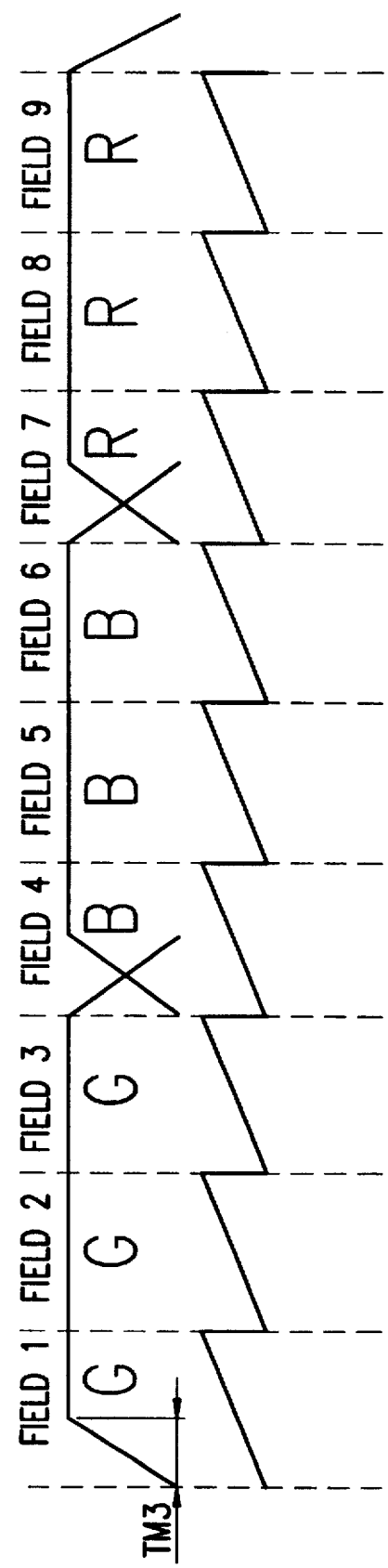
FIG. 6 is a waveform diagram describing the action of a prior-art field-sequential color television camera.

FIG. 5(a1) and FIG. 5(a2) show the result of the regulation of the surface image accumulation interval described above. Both FIG. 5 (a1) and FIG. (a2) relate to cameras in which the color filter is rotated with the same timing shown in FIG. 4 (a). In the case that an accumulation commencement pulse is not given, unlike the present invention, color mixed signals that differ from the pure G, B, and R signals are output, as shown in FIG. 5(a1), because the surface image light accumulation is carried out during the color mixing interval in which the boundaries of the color separating filter pass the imaging element domain, or, in other words, the beginning interval TM1 of each field. In contrast, in the present invention, since an accumulation commencement pulse is given at the end of the color mixing interval (i.e., shutter regulation is performed), a charge does not accumulate during the interval in which the color separating filter boundaries pass the imaging element. As shown in FIG. 5(a2), an image signal with no color mixing is output in each field.

FIG. 5(b1) and FIG. 5(b2) correspond to FIG. 4 (b), a color mixing interval TM2 being present at the beginning of the first field of each two continuous color fields. Because of this color mixing interval, a color mixed image signal is output for the color mixing interval, as shown in FIG. 5(b1), unlike the present invention. In contrast, in the present invention, image signals with no color mixing can be obtained from each field as shown in FIG. 5(b2).

As described above, by using the present invention, extremely high-quality color images with no color mixing are possible because the signal charges accumulated on the surface elements of the solid state imaging element are removed during the color mixing interval in which the color boundaries of the color filter pass over the imaging domain of the solid state imaging element. In addition, since the effective imaging actions can be performed in every field, an extremely rapid image input is possible.

Figure 7:
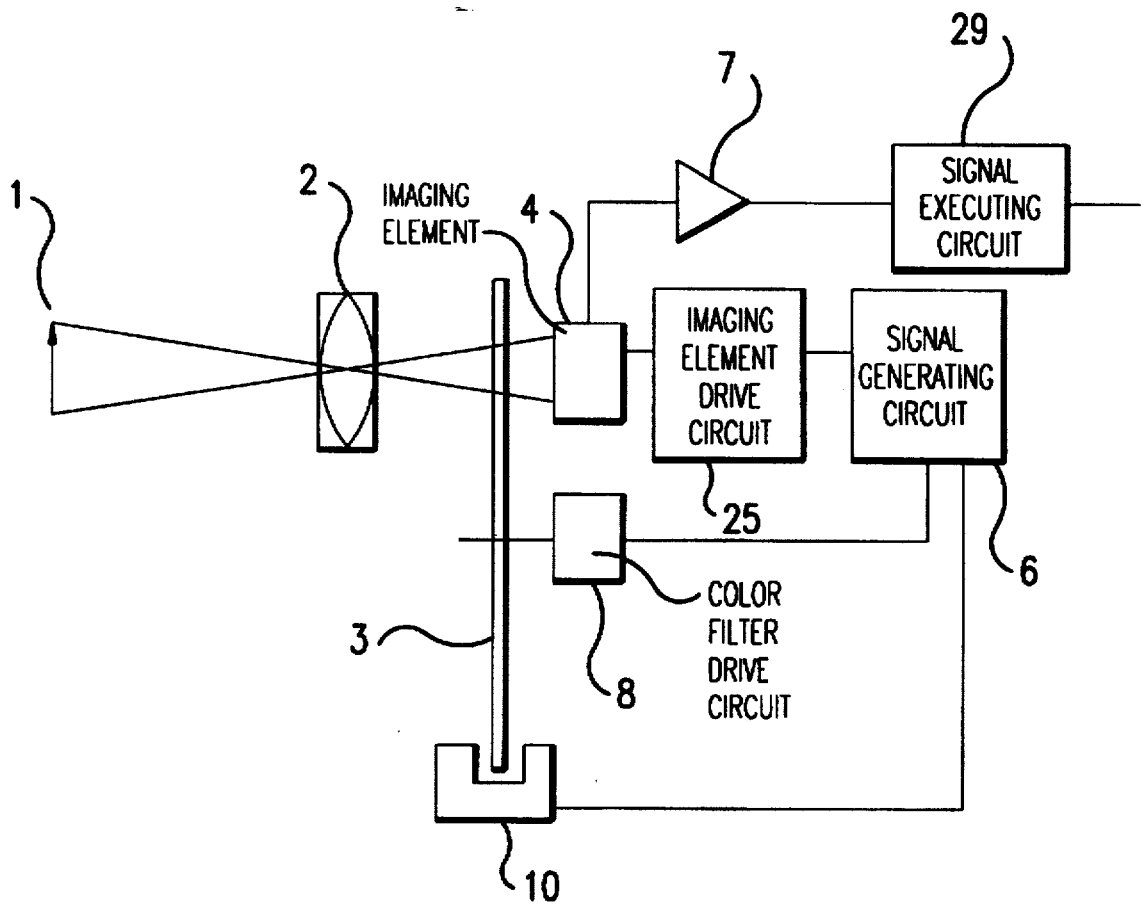
FIG. 7 is a block diagram showing the construction of a field-sequential color television camera that includes a color balance setting device according to third and fourth embodiments of the present invention.
Figure 8A:
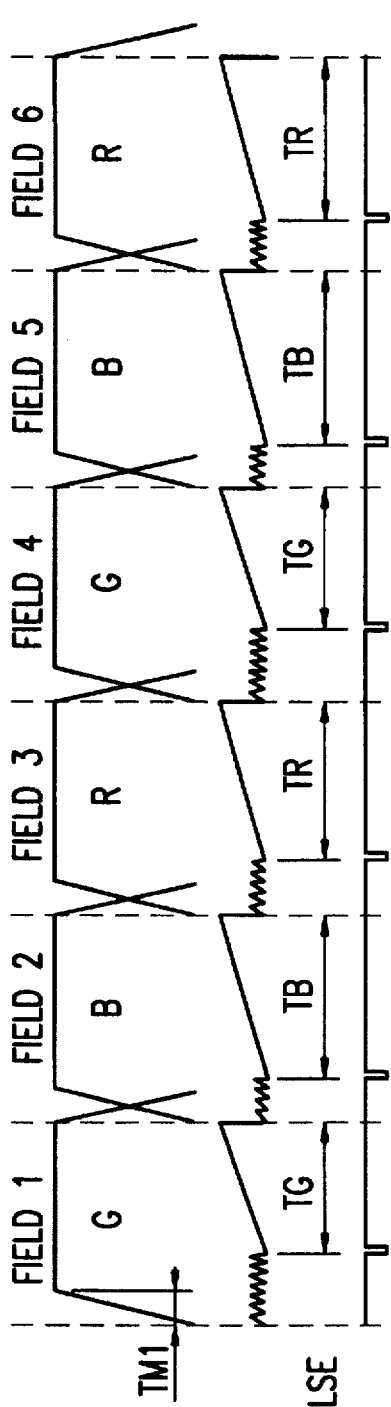
FIG. 8(a) is a signal waveform diagram of the third embodiment of the invention using a three-field color filter in the color television camera of FIG. 7.
Figure 8B:
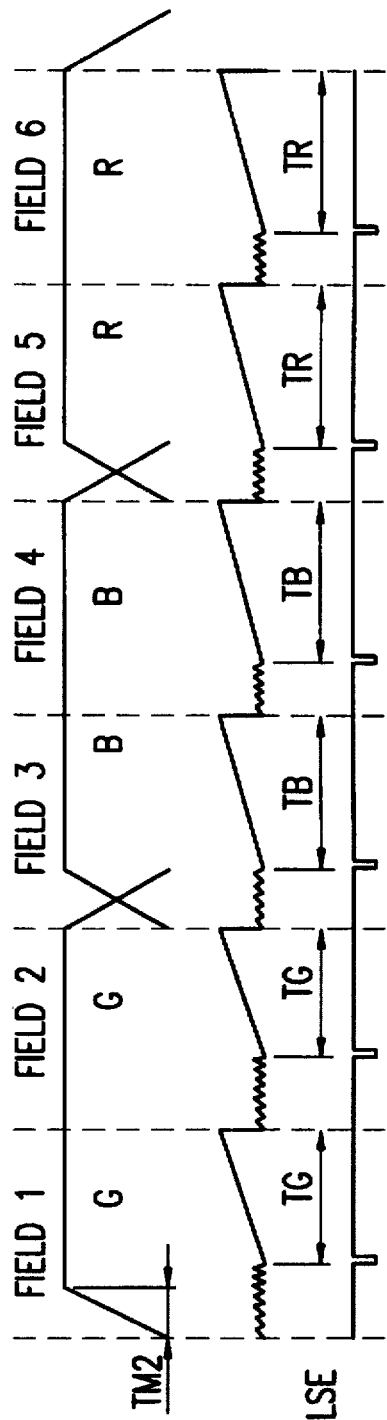
FIG. 8(b) is a signal waveform diagram of the fourth embodiment of the invention using a six-field color filter in the color television cameras of FIG. 7.

Third and fourth embodiments of the present invention are described hereafter, with reference to FIG. 7, FIG. 8a and FIG. 8b. FIG. 7 shows the construction of a field-sequential color television camera that relates to those embodiments of the present invention. In FIG. 7, the same reference numerals have been used to refer to the same elements, which remain unchanged from those of FIG. 1.

The action of a field-sequential color television camera of FIG. 7 is next described, centering on the color balance adjustment action. In FIG. 7, the light from the object being photographed 1 is composed into an image on the imaging surface of the solid state imaging element 4 by the image composing lens 2. The imaging element drive circuit 25 inputs a drive pulse to the solid state imaging element 4 by means of the fixed field cycle, based on the regulating signal from the synchronized signal generating circuit 6, causes the charge accumulated during the color mixing intervals to be swept up, and causes the charge accumulation and transmitting actions to be carried out. A regulating signal from the synchronized signal generating circuit 6 is also input to the color filter driving device 8, and the rotation of the color filter 3 and the scanning of the solid state imaging element 4 are synchronized.

The opaque region 15 of the rotary color filter 3 is detected by the rotation detector 10, which inputs information relating to the rotary position of the rotary color filter to the synchronized signal generating circuit 6. The synchronized signal generating circuit 6 determines the color mixing interval, or the interval during which the color boundaries of the rotary color filter 3 pass over the solid state imaging element 4, based upon from the rotary position of the rotary color filter 3 relative to the position of the imaging surface of the solid state imaging element based on the signal from the rotation detector 10. The synchronized signal output circuit 6 generates a signal that indicates this color mixing interval to the imaging element drive circuit 25.

The imaging element drive circuit 25 generates an accumulation commencement pulse after the color mixing interval has ended, based on the signal from the synchronized signal generating circuit 6, and inputs it to the solid state imaging element 4. At this point, a regulating signal that indicates the correction amount for each color in order to achieve white balance is input to the imaging element drive circuit 25 from the signal executing circuit 29, based on the operation of a white balance setting switch (not shown). The white balance setting switch is operated during a period when a white object, such as white paper, is being imaged as the object of photography 1, or when a surface image with a white light source from a surface image generating device (color video) is being imaged. The imaging element drive circuit 25 sequentially generates an accumulation commencement pulse for each color after the above-mentioned color mixing interval is finished, based on the color balance correction regulating signal from the signal executing circuit 29. The formation timing of this accumulation commencement pulse is the timing by which the surface image accumulation time interval is adjusted for each color, based on the above-mentioned color balance correction regulating signal.

The solid state imaging element 4 operates with an action that sweeps up the surface image charge until the accumulation commencement pulse is received. When the accumulation commencement pulse is input from the imaging element drive circuit 25, the surface image charge begins to accumulate. This accumulation of surface image charge is continued until the end of each field interval, and the charge accumulated at the end of these intervals is transmitted. With this aspect of the present invention, the sensitivity of each color is regulated by varying the surface element charge accumulation interval for each color. This permits differences in light source color temperatures and light permeability rates on the color filter to be taken into account. Accordingly, movie image signals of white objects can be adjusted to the same levels.

The color balance adjustment action that pertains to the aspect of the present invention is described hereafter, with reference to FIG. 8(a) and FIG. 8(b). FIG. 8(a) shows the third embodiment of the invention using a three-field rotary color filter. As described above, the rotation of the color filter is synchronized with the scanning of the solid state imaging element 4 with one color domain of the color filter having a passing time at least as long as one field interval. In FIG. 8(a), the beginning time of each field is designated as the color mixing interval TM1. After this color mixing interval, the surface image charge is accumulated over an interval until the end of each field. However, with this aspect of the invention, the accumulation time intervals TG, TB, and TR are varied for each color G, B, and R within the interval during which the surface image charge can accumulate (i.e., without color mixing), in order to perform a color balance adjustment such as a white balance. Since the solid state imaging element 4 is normally the least sensitive to blue light, the accumulation time for blue light (B), TB, occupies nearly the entire interval after the color mixing time to the end of the field interval. The accumulation times for the other colors, red (R) and green (G), are lower, based on the color balance correction signal.

In summary, according to the third embodiment of the present invention, the charge accumulation time intervals are set with field units for each color, and intervals that include the color mixing intervals outside these accumulation intervals are excluded. In other words, the color balance is adjusted by adjusting the charge accumulation time for each color in the interval during which the same color light is shining on the entire surface element of the solid state imaging element. Each of these accumulation actions are continued until the end of the field interval, transmitted to the CCDs at the end of the field intervals, and then output. Thus, according to the present invention, it is possible to use most of the surface image information from each field interval, including those field intervals that include color mixing intervals, providing high-speed imaging. The color mixing intervals are determined by the structure of the rotary color filter, the relative positions of the axis of rotation 14 of the filter 3 and the imaging element 4, the image surface size of the imaging element 4, the speed of rotation of the color filter 3, and any other relevant variables.

FIG. 8(b) shows a fourth embodiment of the invention, using a six-field rotary color filter. In this case, green (G) light from the object is imaged in fields 1 and 2, blue (B) light is imaged in fields 3 and 4, and red (R) light is imaged in fields 5 and 6, with color mixing intervals TM2 taking place at the beginning of fields 1, 3, and 5. After these color intervals TM2 are finished, an accumulation time interval is set, based on the above-mentioned color balance correcting signal. Fields 2, 4, and 6 do not include color mixing intervals, but, since they each have the same accumulation times as the fields directly preceding them (fields 1, 3, and 5), the timing of the accumulation commencement pulse is the same as when there is a color mixing interval TM2 at the beginning of each field. In this example also, the fields used include color mixing times, thus making high-speed imaging possible.

In the constructions described above, the image signal output from the solid state imaging element 4 is output under white balanced conditions by setting the accumulation time interval for each color so that the scattering of the signal amount caused by light source color temperature, filter spectrum permeability, and light spectrum sensitivity is taken into account. This type of white balance can be achieved by fixing the spectrum permeability of the color filter, varying the light source color temperature, setting the blue accumulation time interval to be large enough so that color mixing will not occur, and adjusting the other color accumulation times TR and TB.

The description of the previous embodiments of the invention provided an explanation of a field-sequential color television camera using a rotary color filter. However, the present invention can also apply to a color television camera that uses multiple CCDs or the like and does not use a rotary color filter. In this case, the color can be balanced by adjusting the surface image accumulation times of the imaging elements corresponding to each color according to the color balance correction regulating signal or the like of each. This differs from previous devices, which performed color balance by adjusting the gains of each color signal. In addition, the present invention can also be used with color television cameras that do not use a rotary filter and which use a single imaging element, provided the camera can regulate the surface image accumulation time intervals for each color.

As described above, with the present invention, since the color balance is adjusted by adjusting the accumulation time intervals of the surface image charge for each color on the solid state imaging element, the need for a color balance adjusting circuit in the movie image signal executing circuit is eliminated, and the color television camera can be made smaller and lighter.

Since a movie image signal that is already color balanced is obtained in the output of the solid state imaging element, the signal output from the signal executing circuit does not fluctuate for each color, and in addition to decreasing the dynamic range of the signal executing circuit, the action of a direct current regenerating circuit is stabilized, and a high-quality surface image signal can be easily obtained.

In addition, since the color balance can be set by adjusting the surface image accumulation time interval for each color during intervals other than the color mixing intervals during which the color boundaries of the rotary color filter are passing over the imaging element, high-speed imaging becomes possible. With the embodiments described above, the charge accumulations for each color can be adjusted so that the accumulated charges for each color are equal, or are set to some other predetermined ratio.

Figure 9:
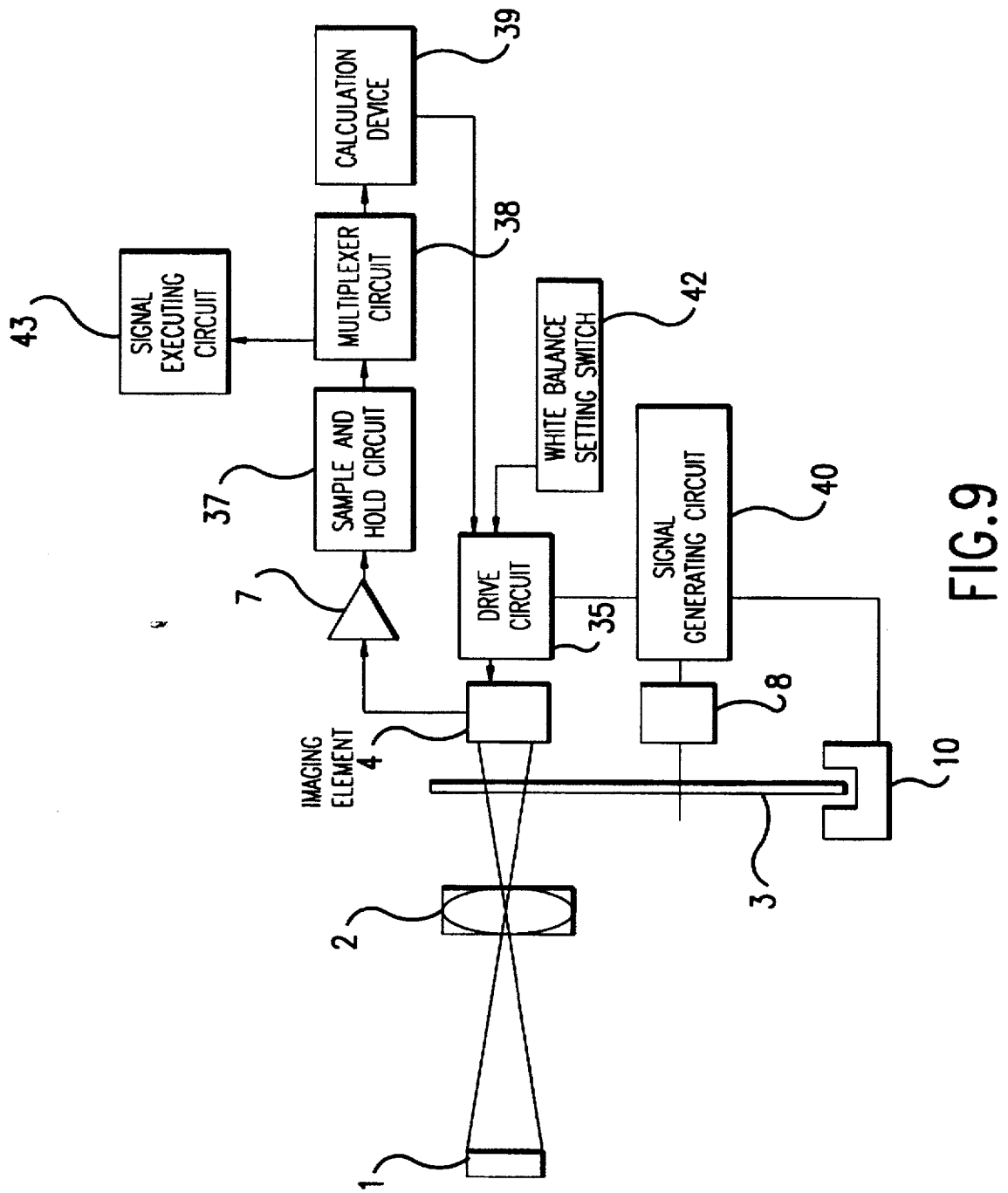
FIG. 9 is a block diagram showing the construction of a field-sequential color television camera that includes a color balance setting device according to a fifth embodiment of the present invention.

A fifth embodiment of the present invention is described hereafter, with reference to FIG. 9, FIG. 10(a), FIG. 10(b) and FIG. 10(c). FIG. 9 shows the construction of a field-sequential color television camera that relates to the implementation of a device and method for setting color balance. In FIG. 9, the same reference numerals have been used to refer to the same elements that remain unchanged from those of FIG. 1.

The device of FIG. 9 is equipped with an amplifying circuit 7 that amplifies the image signal output of the imaging element 4, a sample-and-hold circuit 37 supplied with signals by the amplifying circuit 7, a multiplexer circuit 38 that receives input from the sample-and-hold circuit 37, and a calculation device 39 constructed from a micro processor, or a similar device. The calculation device 39 is equipped with memory for temporarily storing surface image data for each color. The device of FIG. 9 also includes a signal executing circuit 43 for executing the signal from the multiplexer circuit 38 and outputting the desired color movie image signal.

In addition, the device of FIG. 9 is equipped with a synchronized signal generating circuit 40 that generates each regulating pulse supplied to the imaging element drive circuit 35, a color filter driving device 8, such as a motor, that rotatively drives the described rotary color filter 3, based on the regulating signal from the synchronized signal generating circuit 40, a white balance setting switch 42 for starting the setting of white balance, and a rotation detection device 10, such as a photo interrupter, that detects the rotation of the rotary color filter 3. The synchronized signal generating circuit 40 supplies various regulating signals to the solid state imaging element drive circuit 35 and to the color filter driving device 8.

The action of the field-sequential color television camera of FIG. 9 is next described, centering on the color balance adjustment action. In FIG. 9, the light from the object 1 being photographed is composed into an image on the imaging surface of the solid state imaging element 4 by the image composing lens 2. The imaging element drive circuit 35 inputs a drive pulse to the solid state imaging element 4 by means of the fixed field cycle, based on the regulating signal from the synchronized signal generating circuit 40, causes the charge accumulated during the color mixing intervals to be swept up, and causes the accumulation and transmission type actions to be carried out. A regulating signal from the synchronized signal generating circuit 40 is also input to the color filter driving device 8, the rotation of the color filter 3 and the scanning of the solid state imaging element 4 being synchronized.

The opaque region 15 of the rotary color filter 3 is detected by the rotation detector 10, which inputs information relating to the rotary position of the rotary color filter to the synchronized signal generating circuit 40. The synchronized signal generating circuit 40 determines the color mixing interval, or the interval during which the color boundaries of the rotary color filter 3 pass over the solid state imaging element 4, from the rotary position of the rotary color filter 3, and the position of the imaging surface of the solid state imaging element, based on the signal from the rotation detector 10. The synchronized signal output circuit 40 generates a signal that indicates this color mixing interval to the imaging element drive circuit 35.

The imaging element drive circuit 35 generates an accumulation commencement pulse after the color mixing interval has ended, based on the signal from the synchronized signal generation circuit 40, and inputs it to the solid state imaging element 4, as described hereafter. The solid state imaging element 4 then outputs a signal corresponding to the surface image of the object 1 being photographed. That signal is held in the sample-and-hold circuit 37 after it has been amplified by the amplifier 7. The signal held in the sample-and-hold circuit is split into R, G, and B signals in the multiplexer circuit 38. Each signal, R, G, and B, is output to the exterior after the desired surface image execution has been performed by the signal executing circuit 43. Each R, G, and B signal from the multiplexer circuit 38 is also input to the calculation device 39, and, as is described in detail hereafter, a correction signal for the white balance setting is calculated and supplied to the imaging element drive circuit 35.

With this type of field-sequential color television camera, a white balance switch 42 is operated in order to set the white balance. The white balance setting switch 42 is operated while imaging a white object such as a white piece of paper, or while imaging the surface image of a white light source from a surface image generating device (color video). The imaging element drive circuit 35 inputs regulating signals into the solid state imaging element 4 such that the R, G, and B field scan charge accumulation time intervals initially are the same. The equalized accumulation time intervals are set without including the color mixing time intervals.

Under these conditions, the surface image signals corresponding to the surface images of the white object imaged by the solid state imaging element 4 pass through the amplifying circuit 7, the sample-and-hold circuit 37, and the multiplexer circuit 38, as described above, each color signal R, G, and B being input to the calculation device 39. The calculation device 39 calculates a correction signal to regulate the charge accumulation time interval for each color so that the R, G, and B signal amounts will be equal for color balance and inputs the result to the imaging element drive circuit 35. The imaging element drive circuit 35 generates a sequential accumulation commencement signal for each color, based upon the correction signal, for initiating charge accumulation after the described color mixing interval has ended. The charge accumulation time interval is thereby adjusted for each color, based on the described color correction signal, to achieve proper color balance.

The solid state imaging element 4 operates with an action that prevents surface image charge accumulation for transmission until the accumulation commencement pulse is input. When the accumulation commencement pulse is input from the imaging element drive circuit 35, the surface image charge begins to accumulate. This accumulation of surface image charge is continued until the end of each field interval, and the charge accumulated at the end of these intervals is transmitted to the outside. By this means, the accumulation time interval for the surface image charge of each color can be varied, and the sensitivity of each color can be regulated, differences in light source color temperatures and light permeability rates on the color filter being taken into account, and movie image signals of white objects being properly adjusted.

Figure 10A:
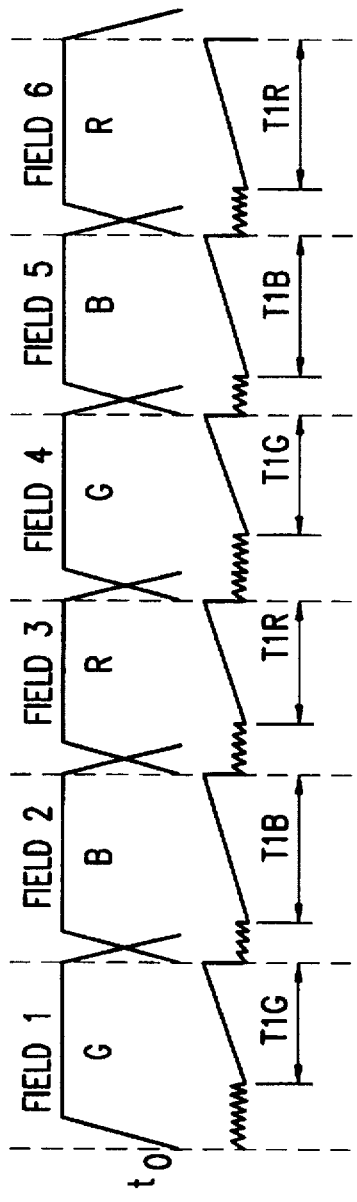
FIG. 10(a) is a signal waveform diagram showing the color balance setting action with the color television camera of FIG. 9 before the operation of the color balance setting switch.
Figure 10B:
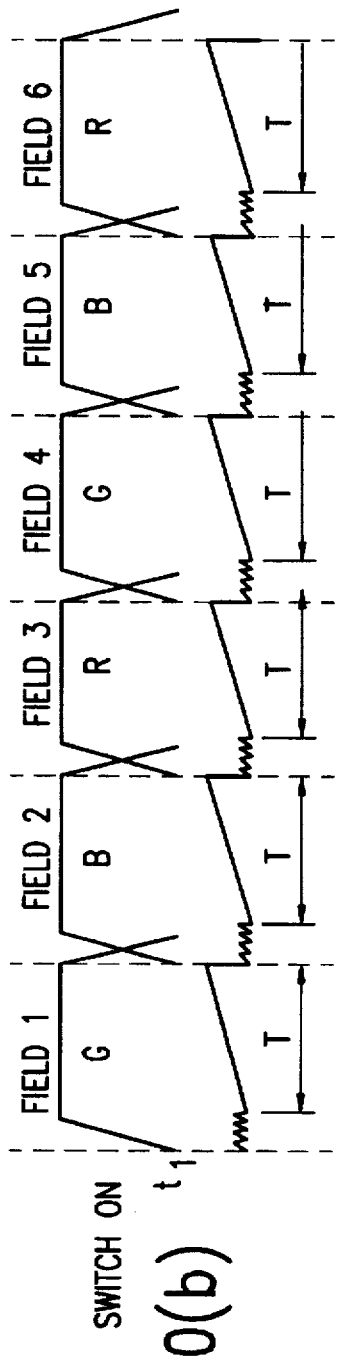
FIG. 10(b) is a signal waveform diagram showing the color balance setting action with the color television camera of FIG. 9 directly after the operation of the color balance setting switch.
Figure 10C:
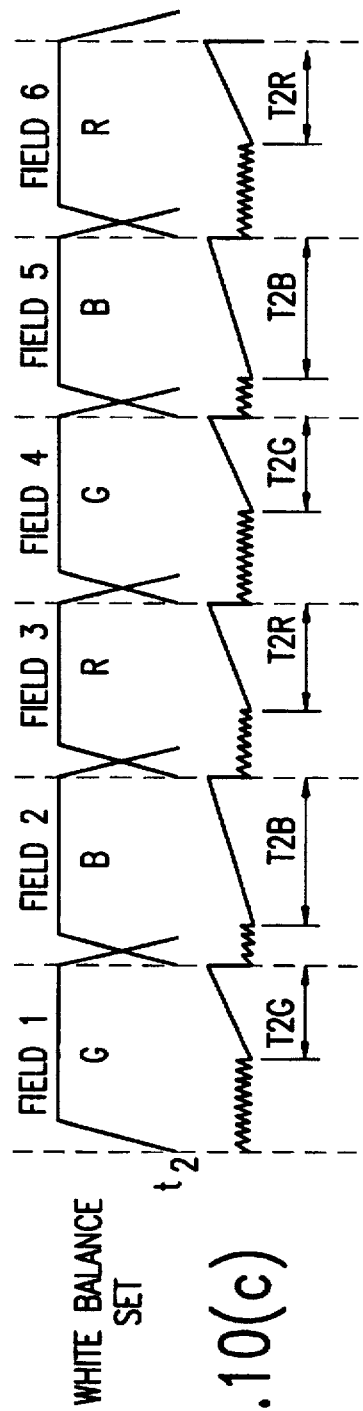
FIG. 10(c) is a signal waveform diagram showing the color balance setting action with the color television camera of FIG. 9 after the color balance setting has been completed.

The color balance setting action the field-sequential color television camera of FIG. 9 is described in further detail hereafter, with reference to FIG. 10(a), FIG. 10(b) and FIG. 10(c). As described above, the rotation of the color filter is synchronized with the scanning of the solid state imaging element 4 with one color domain of the color filter having a pass time at least as long as one field interval. As shown in FIG. 10(a), charges are swept up and not accumulated during the color mixing intervals at the beginning of each field. After the end of the color mixing intervals, surface image accumulation time intervals T1G, T1B, and T1R continue for each color.

When the described white balance setting switch 12 is operated under these conditions, the charge accumulation time intervals of each field are all set to an equal interval T, as shown in FIG. 10(b). The interval T is set from the ending point of the color mixing interval to the end of the field. Then the surface image of the white object being photographed is detected by solid state imaging element 4, image signals corresponding to red (R), green (G) and blue (B) are input to the calculation device 39, and the described color correction signals are produced. The imaging element drive circuit 35 adjusts the timing of the described accumulation commencement pulse through these color correction pulses. FIG. 10(c) shows the state in which the accumulation intervals of the R, G, and B fields have been adjusted according to the color correction signals and the white balance is adjusted. Since B (blue) is normally the least sensitive, the accumulation time T2B for blue light occupies nearly the entire interval after the color mixing time to the end of the field interval. The accumulation times T2G and T2R for the other colors R and G are less, based on the color balance correction signals.

In summary, according to the present invention, the charge accumulation time intervals can be set in every field for each color. Color mixing intervals are excluded by using the sweeping up action of the charge accumulated on the surface element of the solid state imaging element during the color mixing intervals. The color balance is adjusted by adjusting the charge accumulation time for each color in the interval during which light of only one color is shining on the entire surface element of the solid state imaging element. Each of those accumulation actions is continued until the end of the field interval, transmitted at the end of the field intervals, and then output. Thus, according to the present invention, it is possible to use the surface image information from each field interval, including those field intervals that include color mixing intervals, making high-speed imaging possible. The color mixing intervals are determined by the structure of the rotary color filter, the relative positions of the axis of rotation 14 of the filter 3 and the imaging element 4, the image surface size of the imaging element 4, the speed of rotation of the color filter 3, and any other relevant variables.

According to another aspect of the invention, the charge accumulation time interval for the surface image charge of each color was set to the same interval, upon the operation of a white balance setting switch. However, the initial setting of the surface image accumulation time interval for each color may also be set at a predetermined ratio. The color balance then is adjusted based on the calculated correction signal, enabling an extremely simplified and precise color balance adjustment to be performed. Even when the light source color temperature or other photographic states are different, the color balance can be rapidly and precisely set. Moreover, the need for a color balance adjusting circuit in the movie image signal executing circuit is eliminated, and the color television camera can be made smaller and lighter.

Figure 11:
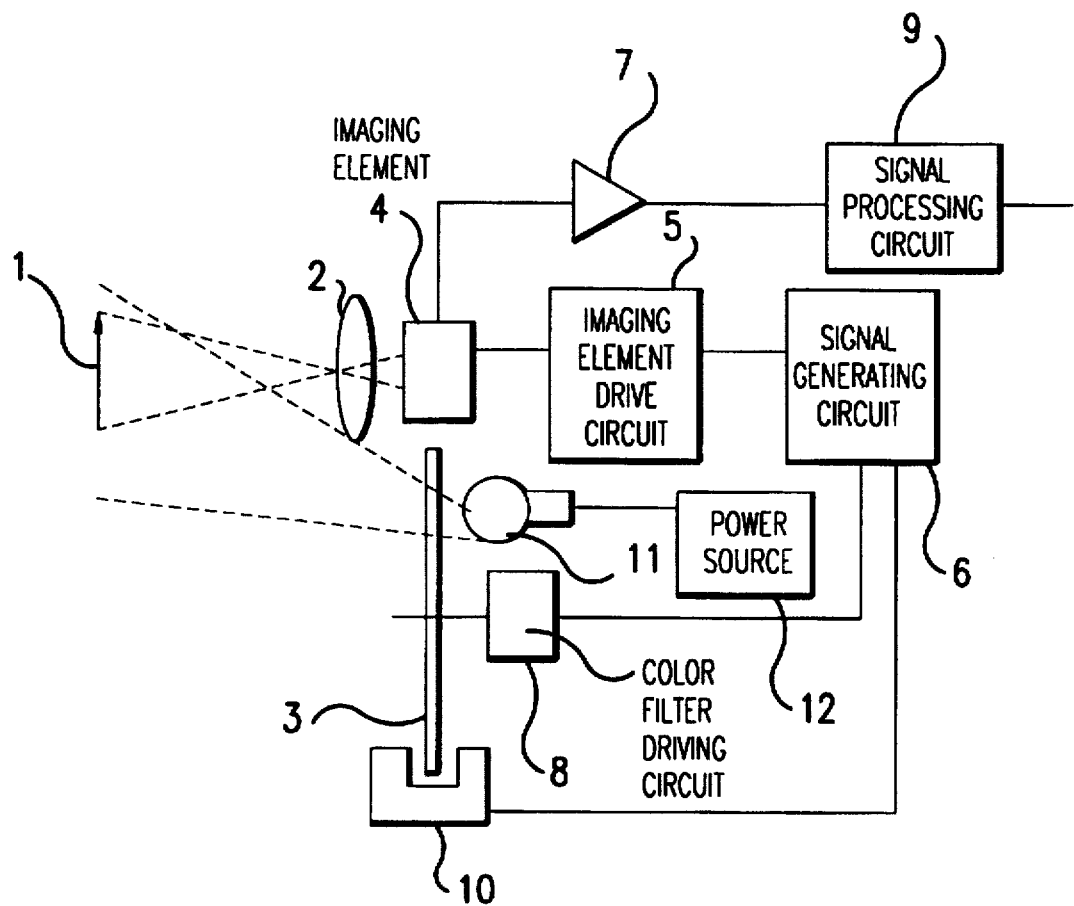
FIG. 11 is a block diagram showing construction of a field-sequential color television camera of a sixth embodiment of the present invention.

FIG. 11 shows the composition of a sixth embodiment of the present invention. Image composing lens 2 faces the photographic object and is an optical system for composing an image of the photographic object onto the stationary photographic imaging element. The stationary photographic imaging element 4 is arranged in the focussing position of image composing lens 2, and photoelectrically converts the light corresponding to the composed object image to electronic picture image signals. The illumination lamp 11 is connected to the electric power source 12. At the time of photography, white light is continuously flashed. The light of the illumination lamp 11 is rotationally chromatically separated by filter 3, and is illuminated to the photographic object through the optical system (not shown).

The color filter 3 is a single filter which has a color permeation ratio of red, green, and blue (hereafter recorded as R, G, and B) as described above with reference to FIG. 2. The color filter 3 rotates through the color filter drive device 8. Rotation detector 10 detects the rotation of the rotating color filter and the output of the rotation detector is input into the synchronous or load discharging signal generating circuit 6. On the basis of the control signal from the synchronous signal generating circuit 6, the photographic imaging element drive circuit 5 inputs the drive pulse to the stationary photographic imaging element 4 with fixed field synchronization, accomplishing the operations of sweeping the picture image, accumulation, and transmission, etc. In this instance, the control signal is input even to the color filter drive device 8 from the synchronization signal generation circuit 6, and scanning of the fixed photographic picture imaging element 4 and the rotation of the color filter 3 are synchronously controlled. The photographic object image is separated into the color components of the 3 colors of R, G, and B.

The stationary photographic imaging element 4 is connected to the drive circuit 5 which generates a drive pulse. The stationary photographic imaging element 4 accomplishes the operation of the electronic shutter in accordance with the drive pulse of the drive circuit 5.

Furthermore, the color balance adjustment operation of the picture image reading device is the same as that of shown in FIGS. 4 and 5.

Figure 12:
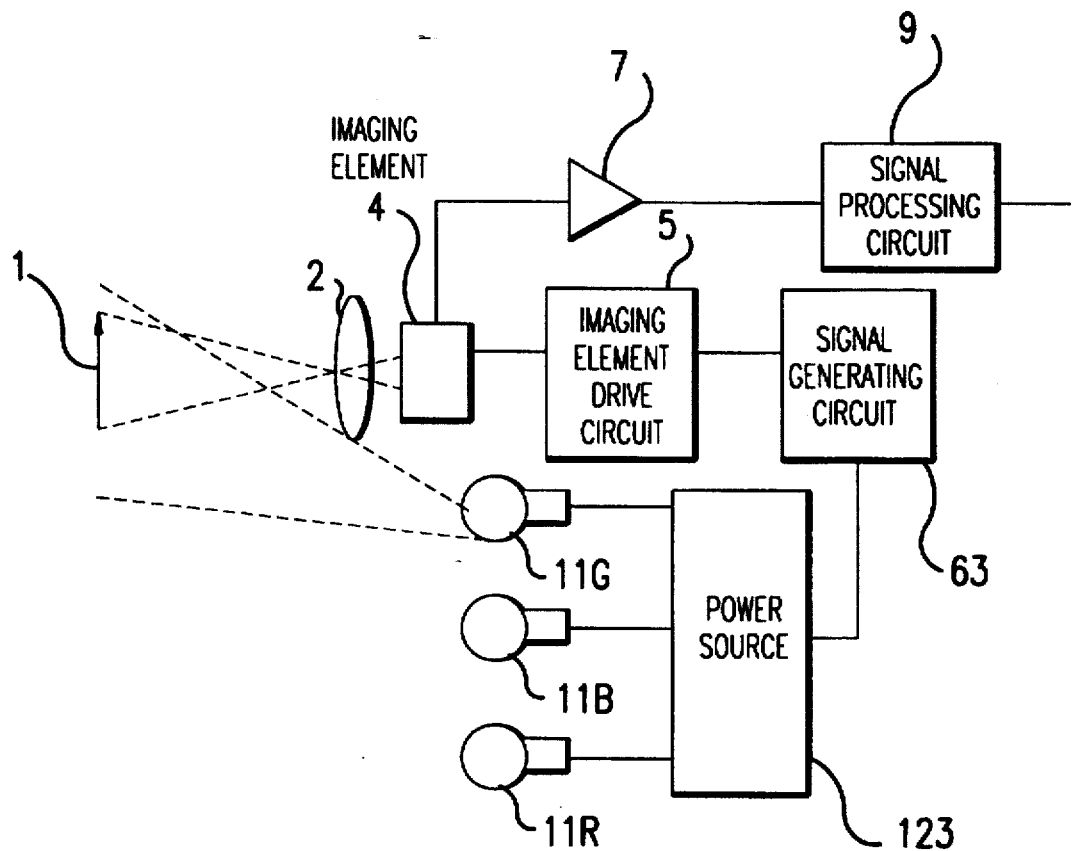
FIG. 12 is a block diagram showing construction of a field-sequential color television camera of a seventh embodiment of the present invention.

FIG. 12 is a block diagram which shows the composition of a seventh embodiment of the present invention. The seventh embodiment omits the rotating filter. The compositional elements which are the same as those of the sixth embodiment have the same label, enabling an abbreviation of the explanation.

The light of the illumination lamps 11G, 11B, and 11R illuminates the photographic object 1 through an optical system (not shown). The illumination lamp 11G is fitted with a green filter on the lamp, producing a green light. The illumination lamp 11B is fitted with a blue filter, producing a blue light. The illumination lamp 11R is fitted with a red filter, producing a red light. The illumination lamps 11G, 11B, and 11R are chronologically switched and light in accordance with a control signal from the synchronous or load discharging signal generating circuit 63.

The picture imaging element drive circuit 5 inputs the drive pulse to the fixed picture imaging element 4 with specified field synchronization, and accomplishes the operations of sweeping the picture image, accumulation, and transmission.

With the structure described above, simultaneously with each emission of the illumination lamps 11G, 11B, and 11R, the image of the solid picture imaging element 4 is swept, and actions, such as accumulating and transferring, are executed. Therefore, the object image is separated into three color components, R, G, and B.

Next, referring to FIG. 4, the operations of the solid picture element are described in detail. FIG. 4(a) shows a case when one illumination among R, G, and B is executed for one field. In addition, the emission of the illumination lamps 11G, 11B, and 11R is executed at the same time as scanning of the solid picture elements as described above.

In FIG. 4(a), time TM1 at the beginning of each field is a mixed color period. Bad response to emitting lights of the lamps causes this. For example, the illumination lamp 11G starts emitting at the time of completion of the field 1; however, because the response of the light being emitted is bad, the illumination lamp 11B starts at the period of TM1. Moreover, the illumination lamp 11B starts emitting at the time of completion of the field 1; however, because the response of the light being emitted is bad, the illumination lamp 11B cannot sufficiently emit light in the period of TM1.

Therefore, the signals accumulated to the pixel of the picture element in this mixed color period are eliminated by sweeping and executing the actions. The accumulation commencing pulse is given at the end of the mixed color period TM1, and the accumulation of the pixel element load is commenced. That is, the accumulating action occurs only in the period when light of the same color is entering all the image elements of the solid picture imaging element. This accumulating action is continued until the end of each field and transferred outside at the end of the field to be output. As described above, no field period is sacrificed and all can be used for reading images, resulting high speed picturing.

In summary, according to the present invention, a load discharging signal controls the timing for discharging a load accumulated during a period in which light having more than two colors enters the imaging element. In this manner, intervals other than the color mixing time intervals of each field are used, and an efficient high speed imaging system becomes possible.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An image processing system comprising:
   a color separating device that chromatically separates light from an object into a plurality of different colors;
   an imaging element that receives separated light from the color separating device, photoelectrically converts the separated light into a converted load, and accumulates the converted load to output image signals corresponding to the chromatically separated light; and
   a load discharging signal generating device that sends load discharging signals to said imaging element, wherein said load discharging signals control timing for discharging a load accumulated in a period when light having more than two colors enters said imaging element.

2. The image processing system of claim 1, wherein said color separating device is a projection device that successively emits light with a plurality of different colors.

3. The image processing system of claim 2, wherein said projection device comprises a light source and a color separation filter, with which light having a plurality of different colors is successively projected by changing said color separation filter.

4. The image processing system of claim 2, wherein said projection device comprises a light source with a plurality of different colors, with which light with a plurality of different colors is successively projected by changing emission of said light source.

5. An image processing system comprising:
   a color separating means for chromatically separating light from an object into a plurality of different colors;
   an imaging means for receiving separated light from the color separating device, photoelectrically converting the separated light into a converted load, and accumulating the converted load to output image signals corresponding to the chromatically separated light; and
   a load discharging signal generating means for sending load discharging signals to said imaging element, wherein said load discharging signals control timing for discharging a load accumulated in a period when light having more than two colors enters said imaging element.

6. The image processing system of claim 5, wherein said color separating means comprises projection means for successively emitting light with a plurality of different colors.

7. The image processing system of claim 6, wherein said projection means comprises a light source and a color filter means, with which light having a plurality of different colors is successively projected by changing said color filter means.

8. The image processing system of claim 6, wherein said projection means comprises a light source with a plurality of different colors, with which light with a plurality of different colors is successively projected by changing emission of said light source.

9. An image processing method comprising:
   chromatically separating light from an object into a plurality of different colors;
   photoelectrically converting separated light into a converted load with an imaging element;

accumulating the converted load on the imaging element to output image signals corresponding to the chromatically separated light; and sending load discharging signals from a load discharging signal generating device to said imaging element to control timing for discharging a load accumulated in a period when light having more than two colors enters said imaging element.

10. The image processing method of claim 9, wherein the step of separating comprises successively emitting light from a projection device with a plurality of different colors.

11. The image processing method of claim 10, wherein the step of separating comprises projecting light with a plurality of different colors from the projection device, wherein the projection device comprises a light source and a color separation filter, with which light having a plurality of different colors is successively projected by changing said color separation filter.

12. The image processing method of claim 10, wherein said separating step comprises projecting light with a plurality of different colors from a projection device comprising a light source with a plurality of different colors, wherein light with a plurality of different colors is successively projected by changing emission of said light source.

* * * * *